(12) United States Patent
Rodriguez Gomez

(10) Patent No.: US 11,247,146 B2
(45) Date of Patent: Feb. 15, 2022

(54) LAMELLA FOR CLARIFIER AND LAMELLAR MODULE FOR CLARIFIER

(71) Applicant: ATCA ASESORIA PROYECTOS E INSTALACIONES, S.L., Alcorcón (ES)

(72) Inventor: Pedro Roberto Rodriguez Gomez, Alcorcón (ES)

(73) Assignee: Atca Asesoria Proyectos E Instalaciones, S.L., Alcorcón (ES)

(*) Notice: Subject to any disclaimer, the term of this patent is extended or adjusted under 35 U.S.C. 154(b) by 0 days.

(21) Appl. No.: 17/270,473

(22) PCT Filed: Jun. 17, 2019

(86) PCT No.: PCT/ES2019/070420
§ 371 (c)(1),
(2) Date: Feb. 23, 2021

(87) PCT Pub. No.: WO2020/039109
PCT Pub. Date: Feb. 27, 2020

(65) Prior Publication Data
US 2021/0322898 A1 Oct. 21, 2021

(30) Foreign Application Priority Data
Aug. 24, 2018 (ES) .............................. ES201830839

(51) Int. Cl.
*B01D 21/02* (2006.01)
*B01D 21/00* (2006.01)

(52) U.S. Cl.
CPC ..... *B01D 21/0042* (2013.01); *B01D 21/0045* (2013.01); *B01D 21/0075* (2013.01); *B01D 21/02* (2013.01)

(58) Field of Classification Search
CPC ............ B01D 21/0042; B01D 21/0045; B01D 21/0075
USPC ......................................... 210/521, 522, 802
See application file for complete search history.

(56) References Cited

U.S. PATENT DOCUMENTS

| 3,928,209 A | 12/1975 | Engdahl et al. | |
| 4,278,545 A * | 7/1981 | Batutis | B01D 21/0075 210/521 |
| 4,597,869 A * | 7/1986 | Hakansson | B01D 21/0045 210/521 |
| 4,722,800 A * | 2/1988 | Aymong | B01D 21/0042 210/802 |

(Continued)

FOREIGN PATENT DOCUMENTS

| CN | 205699626 U | 11/2016 |
| CN | 207270779 U | 4/2018 |

(Continued)

*Primary Examiner* — Christopher Upton
(74) *Attorney, Agent, or Firm* — The Webb Law Firm

(57) ABSTRACT

A lamella for a clarifier formed by a rectangular or square plate, the upper edge and the lower edge of which run parallel to a transverse direction, the two remaining edges running parallel to a longitudinal direction, the plate being provided with longitudinal folds curved in the longitudinal direction and running from the upper edge to the lower thereof; the plate being curved longitudinally, so that the area closer to the lower edge of the plate is less inclined relative to the horizontal than the area closer to the upper edge.

20 Claims, 8 Drawing Sheets

(56) References Cited

U.S. PATENT DOCUMENTS

| | | | | |
|---|---|---|---|---|
| 4,897,206 A | * | 1/1990 | Castelli | B01D 21/0075 |
| | | | | 210/522 |
| 5,028,333 A | * | 7/1991 | Wright | B01D 21/0045 |
| | | | | 210/521 |
| 5,169,004 A | | 12/1992 | Pos | |
| 5,338,449 A | * | 8/1994 | Ichiyanagi | B01D 21/0045 |
| | | | | 210/205 |
| 5,547,569 A | | 8/1996 | Spencer | |
| 7,135,107 B2 | * | 11/2006 | Palmer | B01D 21/0045 |
| | | | | 210/104 |
| 9,327,999 B1 | * | 5/2016 | Philbrook | B01D 21/0045 |

FOREIGN PATENT DOCUMENTS

| | | | |
|---|---|---|---|
| GB | 1477690 A | | 6/1977 |
| GB | 1485007 | * | 9/1977 |
| GB | 2275210 A | | 8/1994 |
| GB | 2354461 A | | 3/2001 |
| JP | H0842068 A | | 2/1996 |
| SU | 1277992 A1 | | 12/1986 |

\* cited by examiner

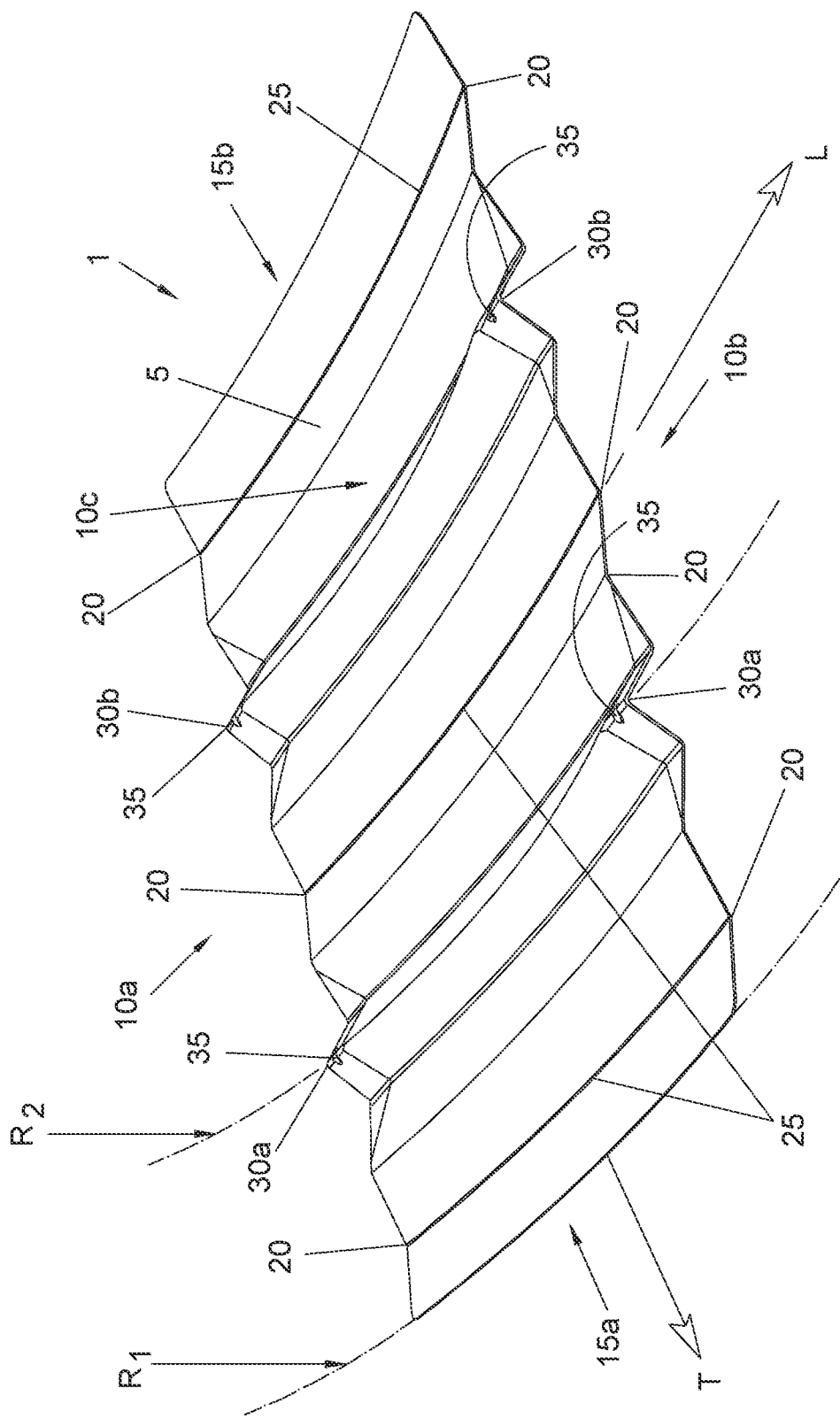

LAMELLA FOR CLARIFIER AND LAMELLAR MODULE FOR CLARIFIER

CROSS-REFERENCE TO RELATED APPLICATIONS

This application is the United States national phase of International Application No. PCT/ES2019/070420 filed Jun. 17, 2019, and claims priority to Spanish Patent Application No. P201830839 filed Aug. 24, 2018, the disclosures of which are hereby incorporated by reference in their entirety.

BACKGROUND OF THE INVENTION

Field of the Invention

The present invention belongs to the technical field of devices and installations for the treatment of effluents contaminated by impurities in the form of suspended solids. Said devices are of the type comprising at least one lamella and/or a lamellar module and are usually used, for example and without limitation, for the treatment of wastewater or drinking water, by clarification of said suspended solids.

More particularly, the object of the present invention is a lamella intended to be used in a lamella clarifier, as well as a lamellar module intended to be used in a lamella clarifier.

Technical Problem to be Solved

A clarifier is a device which is usually used in processes for purifying effluents (i.e., liquids flowing in an industrial installation) for removing suspended solid impurities present in said effluents and, particularly, in the purification of wastewater and treatment of water for consumption.

Clarifiers comprise a tank or receptacle through which an effluent contaminated by impurities in the form of suspended solids is circulated and are capable of at least partially separating said suspended solids from the effluent.

In a clarifier, the effluent to be treated enters at a low speed through inlets which are usually located in the lower portion of the sides of the tank. As suspended solids have a specific weight or density greater than that of the effluent, said solids tend to travel downwards, to the lower area or base of the tank, wherein they gradually accumulate. This accumulation phenomenon in the lower portion of the tank is known precisely as "clarification" and enables the subsequent discharge of the accumulated solids. The effluent now free of solids will leave the tank of the clarifier through the upper portion thereof through collection ducts or spillways.

The downward or lateral speed of the effluent must be such that the clarification speed of the suspended solid enables it to reach the base of the tank before the effluent leaves the tank. Conversely, the solid will be discharged with the effluent, without the clarifier having performed the function thereof.

Some clarifiers are provided with lamellae and/or lamellar modules, for the purpose of increasing the performance thereof. The incorporation of said lamellae and/or lamellar modules in a clarifier enables the effluent flow rate to be treated to be increased or the solid clarification efficiency to be increased.

The lamellae are plates or profiles, usually having an elongated shape. That is, the lamellae usually have a longer main direction referred to as "longitudinal" direction and a shorter, secondary dimension, referred to as "transverse" direction, along which the upper edge of the plate and the lower edge of the plate run. Furthermore, said lamellae arranged in parallel define a series of lamellar channels which are arranged inside the tank at an intermediate height and covering the cross section of the tank, usually with having an inclined orientation, forming an angle of between 45° and 65° relative to the horizontal.

The lamellae therefore force the effluent to be circulated through the lamellar channels in the direction determined by the inclination thereof, thus forming an assembly of small clarifiers which accelerate the clarification process. The lamellar clarifier receives the effluent to be treated through inlets located in the lower area of the sides of the tank, and it is distributed homogeneously across the entire surface of the tank under the lamellae. Given that the extraction of the treated effluent is performed from the upper portion of the tank and above the lamellae, said effluent is forced to circulate through the inclined channels formed by the lamellae. Given the inclination of these channels, the solids are subjected to two different forces, the force generated by the effluent on its upward path and in the direction of the lamellar channel and to the force of gravity in downward vertical direction. The composition of both forces generates a path of the solids bringing them closer to the lower portion of the lamellar channel wherein they cluster and form larger floccules. Due to this clustering, the solids are capable of more readily overcoming friction with the upward effluent, increasing the natural clarification speed thereof and generating a downward flow along the lower face of the lamellar channel. That is, inside each lamellar channel two countercurrent continuous flows are formed: one is the effluent in the upward direction and the other one is formed by the solids which cluster together on the lower face and in the downward direction. When the solids leave the lamellar channel through the lower portion, they have already generated a higher cohesive force between one another and tend to remain clustered together on the downward path thereof, to the base of the tank wherein they will be discharged. Finally, the water or effluent, free of solids, leaves the lamellar channels through their upper portion and will continue the upward path thereof until being discharged by means of the collection ducts or spillways located in the upper portion of the tank and leading the effluent out of the tank in order to continue with the following phases of the purification process.

The efficacy of a lamella clarifier is usually evaluated on the basis of the following aspects: the treatment capacity, that is, the amount of effluent that a lamella clarifier is capable of treating per unit of time; the efficiency in the removal of solids present in said effluent; and the maintenance requirements for said lamella clarifier to operate under suitable capacity and efficiency parameters. These maintenance requirements largely depend on fouling processes occurring due to the progressive accumulation of solids adhered on the entire surface of the lamellae or lamellar modules, as well as on the supporting structures of said lamellae or lamellar modules.

As will be described in detail below, in the sector of clarification devices there is a need to maximise the treatment capacity per unit area, maximise the reduction of suspended solids in the treated effluent and, simultaneously, minimise maintenance requirements, since they involve shutting down the clarifier and generating costs associated with the corresponding cleaning tasks.

These three fundamental aspects depend, on one hand, on the actual tank of the clarifier, and on the other hand, and fundamentally, on the type of lamellae or lamellar modules installed and the supporting system thereof.

The supporting systems of the lamellar modules, or racks, are usually located on the outside of the lamellar module itself and inside the clarification tank at a medium height above the bottom of the tank so that, during the process, supporting structures and lamellar modules will be completely immersed. Some lamellar modules, especially those manufactured from plastic materials with densities close to that of water are, furthermore, usually provided with a structure which prevents the flotation thereof, either due to the hydraulic thrust to which they are subjected or due to the low density thereof. Said anti-flotation structure is usually arranged in the upper portion of the lamellar modules.

In relation to the tank, capacity and efficiency will depend on the size thereof both in terms of surface area and total volume, and on the geometry and design thereof, which will enable suitable distribution of the effluent across the entire surface thereof, correct extraction of the accumulated solids at the base thereof or a balanced discharge of the treated effluent by means of the outlet spillways or ducts. The features of the tank do not largely affect maintenance, provided that the clarified solid or sludge discharge system is properly designed and sized.

In relation to the installed lamellae or lamellar modules, the capacity, efficiency and maintenance of the installation will depend, among others, on factors as numerous and diverse as: the geometry of the lamellae or lamellar modules; the size thereof; the distance between lamellae; the cross section of the lamellar channels; the angle of inclination; hydraulic performance; surface finishes of the materials making up the lamellae; systems for assembling modules; racks and supporting systems inside or outside the tank; effective surface losses generated by said racks and supporting structures which close off many of the lamellar channels, etc.

Three types of lamellae are fundamentally known which are attached to one another in order to form lamellar modules:

I) Flat lamellae. These lamellae are already known and consist of sheets having a flat geometry assembled on supporting structures previously installed inside the tank. It is common to assemble them by forming independent modules by means of external racks made with side sheets or profiles to be subsequently installed on supporting structures inside the tank. These flat lamellae form lamellar channels having a rectangular cross section, the length of which will be the width of the lamella and the width thereof will be the distance between each of the lamellae or sheets installed. Lamellar channels of this type present a good hydraulic performance as a result of that continuous rectangular channel geometry, without more intermediate partitions along the entire width thereof than those that form the side racks, presenting relatively low hydraulic losses of approximately 2-3%. However, they present operating deficiencies fundamentally due to the low capacity to concentrate solids (also referred to as "sludge"). Given the flat surface thereof, the solids reaching the lower face of the lamellar channel are gradually deposited on the entire surface thereof more or less homogeneously, and particularly in the upper area of the modules, generating an increasing layer. When this is due to accumulation, these solids detach and are able to commence the descent, they do so in an abrupt manner, altering the upward effluent flow, part of the solids break apart and are entrained by the effluent without any possibility of again reaching the lower faces of the lamellar channel and leaving the lamellar modules with the effluent towards the collection channels, which represents a very significant loss in yield. The fraction of solids which is able to leave the lamellae through the lower portion thereof will do so along the entire lower edge of the lamella forming a "curtain" with hardly any cohesive forces between the particles, it will form a barely concentrated sludge with scarce density which, again, will readily break apart upon encountering the upward flow towards the lamellar modules. Part of these solids will again be entrained by the upward effluent towards the lamellar modules. All this considerably reduces the efficiency of the clarification process.

Lamellar modules of flat lamellae have large effective surface losses due to the necessary supporting structures and the arrangement of collection channels, generally located between two lines of modules, thus limiting the available surface for the passage of the effluent through the lamellae. These losses may exceed 20% of the available surface of the tank, attempting to compensate for such which losses with a longer lamella length and therefore greater module height. Likewise, and due to the flat geometry and the considerable length thereof, they must be made of highly resistant materials so as to enable ensuring the mechanical stability thereof in the event of accumulating high sludge loads due to fouling which, when drained, will compromise the flat structure thereof with very high weights. This, combined with the need to prevent corrosion, virtually forces the use of stainless steel, resulting in facilities having a very high cost, in the order of 5 to 7 times the cost of an installation made with plastic materials.

II) Tubular lamellae. Said lamellae are formed by means of successively assembling profiles generally extruded from plastic material. By successively assembling these profiles to one another, closed lamellar channels (or ducts) are formed, which are parallel and attached to one another, until reaching the design dimensions of the lamellar module to be installed. The usual geometries of these channels are hexagonal or honeycomb-shaped, rectangular, chevron- or square-shaped, all of them having in common the internal partitioning forming the channels and the low passage cross-section of each of these channels. This type of tubular lamellar module has very high losses due to the hydraulic performance of the effluent inside the lamellar ducts and specifically due to the high speed gradient produced inside same, like in any duct, and particularly in the case of a laminar flow. Along the entire perimeter of the lamellar channel, the very-low or 0-speed areas occupy an important part of the cross section of the duct. In practice, these areas can be considered inoperative, with most of the effluent circulating through the central area of the lamellar duct and therefore at a higher speed, so that a large part of the solids do not have time to reach the lower face of the lamellar channel and are discharged with the treated effluent. Hydraulic losses in these cases range between 12 and 18%. Another drawback, and also due to this intermediate partitioning, is the large amount of surface area of the material in contact with the effluent and therefore with the solids present therein. This generates a very fast and once again more accentuated fouling model in the upper portion of the lamellar channels or modules, which is faster the smaller the cross section of these closed lamellar ducts or channels are, requiring more frequent maintenance actions. These maintenance actions require shutting down the installation, emptying the tank and plant operators performing the corresponding cleaning works, raising the operating costs.

Likewise, in tubular lamellar modules, the attachment systems between profiles forming the modules usually incorporate longitudinal guides, welds, clamps, etc., which generate areas wherein the sludge can readily be adhered, once again accelerating the fouling processes. The type of supporting structures requiring modules of this type for the installation thereof inside the tank must be strongly reinforced in anticipation of high accumulated sludge loads in the modules, which leads to high effective surface losses due to the dimension of the profiles that are required. The modules are supported on these profiles in the peripheral areas thereof, many of the ducts being partially or completely closed off at the lower portion thereof. These effective surface losses due to closing off the channels in the supports may range between 7 and 12%. The oversizing necessary for these supporting structures further results in a very high cost thereof. Since modules of this type are manufactured in plastic materials with densities close to that of water often require anti-flotation structures which close off part of the ducts of the modules, this time at the upper portion thereof, and further generate areas wherein solids are deposited, contributing to the fouling processes. Lastly, for manufacturing modules of this type, the assembly of between 80 and 140 profiles per cubic metre of module depending on the cross section of the formed channel is required, which must be clamped, welded or glued, requiring a great deal of time and manual labour, and therefore very high production costs.

III) Tubular lamellae formed by overlapping and gluing or clamping thermoformed plastic sheets. Since these sheets overlap with one another, they form, like in the preceding case, lamellar channels having certain geometries, wherein hexagonal geometries are the most common. In this case, they differ from the aforementioned ones in the manner in which they are manufactured and assembled, with the final geometry being very similar and presenting the same problems of loss of efficiency and very poor performance against fouling. Furthermore, and due to the low thickness of the thermoformed sheets used, most lamellar modules of this type require an external rack providing it with the necessary mechanical stability, which generates additional effective surface losses of effective clarification due to the closing off of a portion of the lamellar ducts caused by said rack, and due to the gaps generated by the racks once they are placed in the tank. These racks generate additional surfaces wherein the sludge can be deposited, causing premature fouling. These external racks usually have to be made of stainless steel so as to prevent corrosion, which again raises the costs of the lamellar module.

At present, all the lamellae or lamellar modules formed from plastic materials are only made by means of extrusion or thermoforming processes. These processes do not in any way enable providing the lamellae or profiles forming the modules with different thicknesses in each area based on the possible mechanical requirements or stresses they must withstand, which limits the configurations, geometries and assembly modes to what exists in the state of the art. In the current state of the art, there is no known lamella, sheet or profile intended to form a lamellar module that can be made by means of plastic injection technology.

Likewise, all the types of lamellae described above and belonging to the state of the art are straight along the longitudinal direction thereof, that is, the inclination thereof is constant along said direction. This means that the operative performance of the lamellae of the prior art is identical along the entire longitudinal direction, despite the fact that, as will be described in detail below in the present specification, the solids and the flows of solids initially suspended in the effluent behave differently based on the specific position, along the longitudinal direction, wherein they are located.

Premature fouling in the upper areas of said straight lamellae is common to all the described technologies from the state of the art. This is because the solids that reach these upper areas are the most lightweight, with the lowest clarification capacity and therefore are more capable of adhering to the surface of the lamellae, generating consistency and progressive accumulation.

SUMMARY OF THE INVENTION

The present invention intends to correct or reduce the aforementioned problems and drawbacks of the prior art.

To this end, a first object of the present invention relates to a lamella for a clarifier formed by a rectangular or square plate, the upper edge and the lower edge of which run parallel to a transverse direction, the two remaining side edges of said plate running parallel to a longitudinal direction, said lamella being characterised in that:

The plate is curved along the longitudinal direction thereof so that, in the working position thereof, the area closer to the lower edge of the plate is less inclined relative to the horizontal than the area closer the upper edge of the plate, and in that The plate is provided with a plurality of longitudinal folds, said longitudinal folds running from the upper edge of the plate to the lower edge of the plate and said longitudinal folds being provided with a curvature in the longitudinal direction.

The lamellae according to the present invention are intended to be placed as described below, in the working position thereof inside the tank of a clarifier: the lower edge of the plates of the lamellae is oriented towards the base of the tank, whereas the upper edge must point towards the upper portion of said tank.

The fact that in the lamellae according to the present invention the plate forming said lamella is curved along the longitudinal direction thereof so that, once placed in the working position thereof, the lower portion thereof is less inclined relative to the horizontal than the upper portion thereof, contributes to preventing processes of accumulating solids in the upper area of said lamellae by helping these solids commence their descent, which translates into fouling processes being slowed down, being kept clean and under suitable efficiency conditions for a longer time, prolonging the periods between maintenance actions and reducing the costs of said actions.

When the lamellae are in the working position thereof, the lower portion of each lamella receives coarser solids having a higher clarification capacity, as well as a flow of solids coming from the accumulation of all the solids received along the entire lamellar length.

In the lower portion of the lamellae an entrainment effect is produced which is generated by these coarser solids facilitating the discharge of all the solids in this area, preventing the permanent accumulation and the progressive closing off of the lamellar duct. For this reason, in the lamellae according to the present invention, the angle of inclination on the horizontal is smaller in the lower portion thereof. This smaller angle of inclination reduces the vertical clarification distance to the lower surface of the lamellar channel, providing a higher clarification capacity in this area.

Conversely, in the upper portion of the lamella (that is, in the area closer to the upper edge thereof), a smaller amount of solids, which are furthermore the most lightweight solids, are received given that they are the ones that needed more time to reach the lower surface of the lamellar channel.

These solids have a lower clarification capacity and higher capacity to remain adhered to said surface; over time, they may generate consistency and progressively accumulate, occupying an increasingly larger cross section of the lamellar channel. This loss of cross section available for the passage of the effluent causes the speed thereof through these upper areas of the lamellar module to increase until it finally ends up entraining a portion of these solids through the upper outlets of the lamellar channels in order to finally be discharged with the treated effluent through the collection channels or spillways This entrainment of solids and the discharge thereof with the treated effluent represents one of the factors which reduces the yield of the technologies of the state of the art the most. In fact, it is particularly estimated that they entail a reduction in yield of between 3 and 15%.

To address this drawback of the prior art, the lamellae according to the present invention have, as described above, a greater inclination relative to the horizontal in the upper portion thereof. This specific configuration helps these solids with a lower clarification capacity, present in the upper area of the lamella, to commence the descent thereof, reducing the progressive accumulation thereof. In view of the tests performed by the applicant, it is estimated that in some advantageous embodiments of the lamellae according to the present invention, the reduction in yield due to the loss of available section and entrainment of solids is between just 1 and 5%.

Likewise, once the lamellae according to the present invention have been placed in the working position thereof inside a clarification tank, the longitudinal folds thereof are intended to concentrate the solids in the lower areas or valleys of said folds. With this higher concentration, the solids will have greater cohesion and a higher downward flow generation capacity and clarification capacity in order to leave the lamellae through the lower portion thereof and towards the bottom of the tank. This greater cohesion and higher concentration will help the solids, upon encountering the upward and lateral flows produced inside the clarification tank without breaking apart, which enables them to more easily reach the bottom of the tank. Again, this higher capacity for draining the solids reduces the losses in yield due to entrainment, compared with the lamellae of the state of the art.

The better performance against fouling of the lamellae according to the present invention will enable the distance between the faces of said lamellae to be reduced upon being placed in the working position thereof in a lamellar module inside the tank of a clarifier, therefore increasing the effluent treatment capacity per unit area installed.

The smaller the distance between the faces of the lamellae, the less time will be needed for the suspended solid to reach the bottom of the lamellar channel; this will in turn enable the effluent circulation speed and the total effluent flow rate entering the clarifier to be increased.

The lamella must further have mechanical resistance features enabling it to cope with the stresses that will be produced under certain conditions, fundamentally when the tank is being emptied and the entire structure thereof supports the load of its own weight plus the weight of the possible accumulated sludge.

The fact that, in the lamellae according to the present invention, the plate is curved along the longitudinal direction thereof provides a moment of inertia in the transverse direction, increasing resistance to the longitudinal bending of said lamellae.

In a preferred embodiment of the invention, the lamella comprises at least one longitudinal fold demarcated by two wings, forming an obtuse angle with one another, preferably an angle of between 150 and 160°. This specific configuration of the folds in a lamella according to the present invention facilitates the concentration of the suspended solids in the valleys of said folds (forming part of the lamellar channels) and accelerates the downward flow of said solids inside the tank of a clarifier.

In another preferred embodiment of the invention, the lamella further comprises at least one longitudinal structural rib, curved along the longitudinal direction and demarcated by two wings running from the upper edge of the plate to the lower edge of the plate, forming a variable angle with one another, said angle being:

between 80 and 90° in the vicinity of the upper edge,
between 80 and 90° in the vicinity of the lower edge, and
progressively increasing until reaching between 115° and 120° in the central region of the lamella.

Said structural ribs described in the preceding paragraph provide the lamella, according to this particular embodiment of the present invention, with further mechanical resistance against different stresses to which it may be subjected once it is installed in the working position thereof inside the tank of a clarifier.

Thus, the angle of 115° and 120° formed by the wings of the structural rib in the central portion of the lamella confer good mechanical resistance both against transverse bending stresses and against compression stresses received in that area. On the other hand, the most acute angle (between 80° and 90°) formed by the wings of the structural rib at the ends of the lamella (that is, in the vicinity of the upper edge and lower edge thereof) maximises mechanical resistance against bending stresses received in those areas, which areas in preferred embodiments of the lamellae according to the invention will act as anchoring points.

In the lamellae according to the present invention, at least one longitudinal structural rib is preferably provided with anchoring points for anchoring to a supporting element, said anchoring points being arranged in the vicinity of the upper edge of the plate and in the vicinity of the lower edge of the plate.

Preferably, in this particular embodiment of the invention, the area closer to the upper edge, the area closer to the lower edge and the central region of said structural rib (or alternatively said structural ribs) have a thickness greater than the rest of the rib, said at least one structural rib further having a thickness greater than the rest of the lamella.

Those portions of the rib that will withstand greater stresses are thereby reinforced.

Thus, the vicinity of the upper edge, the vicinity of the lower edge and the central region of said structural rib (or alternatively of said structural ribs) preferably have a greater thickness between 3 and 3.5 mm, the thickness in the remaining portions being between 2.5 and 3 mm.

The lamellae according to the present invention are preferably plastic lamellae manufactured by plastic injection. Polypropylene, acrylonitrile butadiene styrene (ABS), polystyrene and recycled plastics are non-limiting examples of preferred plastic materials for manufacturing the lamellae according to the present invention.

In this sense, it is important to point out that none of the methods currently used in the state of the art for manufacturing plastic lamellae, namely, plastic extrusion and plastic thermoforming, enable a lamella to be provided with two or more areas having different thicknesses, as contemplated in the embodiments of the present invention indicated above.

This fact represents an evident obstacle for, based on the prior art teachings, developing a lamella with the technical features contemplated by the embodiments of the present invention described above.

More particularly, extrusion is not a method capable of forming a lamella with the technical features contemplated by the embodiments of the present invention described above, because the cross section of said lamellae according to the invention varies continuously along the entire length thereof and this method of manufacturing does not enable the part to be made with different thicknesses. This would therefore prevent the longitudinal ribs with a greater thickness than the rest of the lamella from being provided. Extrusion would not enable the longitudinal curvature of the sheet of the lamella, a feature of the lamellae according to the present invention, to be performed either.

Thermoforming is not a method capable of forming a lamella with the technical features contemplated by the embodiments of the present invention described above because it does not enable the part to be provided with different thicknesses depending on the needs thereof. This would therefore prevent the longitudinal ribs with a greater thickness than the rest of the lamella from being provided. In fact, in the event of trying to construct a lamella with the technical features contemplated by the embodiments of the present invention described above, the ribs would have a smaller thickness as greater drawing is experienced during the process than the area comprised between the ribs and side areas, to enable being adapted to the greater height of the wings of the rib. This would prevent the structural folds from having a greater resistance than the rest of the lamella and the weight from being lower in the side areas thereof. In fact, the result that would be obtained by using a thermoforming method would be completely opposite to that desired: lower resistance of the structural ribs and greater weight in the areas located on both sides of said ribs.

The plastics used for manufacturing the lamellae of the embodiments of the present invention indicated above may optionally be provided with additives for protection against ultraviolet rays and/or with reinforcement materials, such as the glass fibre, providing greater rigidity to the lamella.

In another additional preferred embodiment of the invention, the lamella comprises at least a first longitudinal structural rib located at ⅓ the total width of the lamella in the transverse direction and at least one second longitudinal structural rib located at ⅔ the total width in the transverse direction, the first structural rib and the second structural rib being provided with anchoring points for anchoring to a supporting element, said anchoring points being arranged in the vicinity of the upper edge of the plate and in the vicinity of the lower edge of the plate.

In this particular embodiment of the invention described in the preceding paragraph, the lamella is preferably divided transversely into three different areas:

a central area, comprised between the first structural rib and the second structural rib and secured by said structural ribs;

a first side area, located between the first structural rib and the closest side edge, and a second side area, located between the second structural rib and the closest side edge;

further being characterized in that the first side area and the second side area are cantilevered when the lamella is arranged in the working position thereof, inside a clarifier tank.

The first side area and the second side area are therefore cantilevered, that is, they are prolonged beyond the anchoring points supporting them (i.e., the anchoring points of the first structural rib in the case of the first side area, and the anchoring points of the second structural rib in the case of the second side area). Said cantilevered areas could potentially represent a weak point of the lamella with respect to stresses which generate longitudinal bending, for example, the actual weight of the lamella and the weight of solids (or sludge) that may be adhered thereto. Nevertheless, and as seen above, the lamella according to the present invention is provided with a longitudinal curvature provided it with an additional moment of inertia in the transverse direction, which it would not have without said curvature and which noticeably increases the resistance thereof to longitudinal bending.

Likewise, said cantilevered areas will generate a longitudinal bending stress on the structural rib due to their own weight and the weight of the sludge that may accumulate on the surface thereof. Therefore, these cantilevered areas preferably have a thickness less than the rest of the lamella so as to reduce as much as possible the stress caused by their own weight.

This sizing and design contemplated by the embodiment mentioned in the preceding paragraphs will enable the geometry of the lamellae to remain unchanged in the event of stresses due to their own weight and additional lightweight loads. This will enable it, for example, to be left without being immersed for an indeterminate time without acquiring any deformation whatsoever. In contrast, in the event of a significant accumulation of sludge on the surface thereof and in the case of the emptying of the tank starting, the lamella will experience stress due to the weight of the sludge and will deform in these side cantilevered areas, increasing the inclination thereof with respect to the vertical, facilitating the discharging of said accumulated solids. Once it has been freed of the load, it will immediately return, as a result of the flexibility of the plastic, to the original shape thereof without ever presenting any permanent deformation.

In another embodiment of the present invention, the plate is curved along the longitudinal direction thereof, describing a first constant radius of curvature. In said embodiment, the first constant radius of curvature is preferably 7 to 12 metres and more preferably 9 to 10 metres.

In this latter more preferred case (radius of the plate of 9 to 10 metres), when the lamellae are placed in the working position thereof, the one tangent to the lower edge of the lamellae forms an angle in the order of 55° with the horizontal and the one tangent to the upper edge thereof forms an angle in the order of 65° with the horizontal. When the lower edge and the upper edge of the lamellae describe these specific angles with the horizontal, the clarification capacity in the lower portion of the lamella is maximized, and the accumulation of solids in the upper portion thereof is simultaneously minimized.

In another additional embodiment of the present invention, the lamella comprises at least one structural rib, said structural rib being curved along the longitudinal direction thereof according to a second constant radius of curvature, the plate of the lamella furthermore being curved along the longitudinal direction thereof according to a first constant radius of curvature, and the second constant radius of curvature being less than the first constant radius of curvature.

Preferably, the first constant radius of curvature (of the plate) is 9 to 10 metres and the second constant radius of curvature (of the structural rib or alternatively of the structural ribs) is 7 to 8.5 metres. This specific configuration increases the resistance to longitudinal bending of the rib or structural ribs against the stresses previously described generated by the cantilevered side areas.

In another additional embodiment of the present invention, the plate of the lamella is polished, which contributes to slowing down the fouling processes.

A second aspect of the invention relates to a lamellar module for a clarifier comprising two or more lamellae, according to the first aspect of the invention, arranged in parallel without direct contact with one another and attached to a supporting element.

In the lamellar modules according to the present invention, the intermediate partitions which were necessary in the tubular lamellae technologies of the state of the art for forming tubular-shaped, closed lamellar channels (ducts) are therefore eliminated. As a consequence, the lamellar modules of the present invention present a better hydraulic performance than that of the mentioned tubular lamella technologies since the presence of intermediate partitions generates a plurality of areas wherein the speed of the effluent is zero or very low, giving rise to the subsequent hydraulic losses.

In a preferred embodiment of the invention, the lamellar module is characterized in that:

each of the lamellae is provided with at least one longitudinal structural rib, provided with anchoring points in the form of through holes, said through holes being located in the vicinity of the upper edge of the plates of the lamellae and in the vicinity of the lower edge of the plates of the lamellae, and in that the supporting element comprises at least two groups of threaded rods, the first group of threaded rods being arranged so that they cross through the through holes provided in the vicinity of the upper edge of the plates of the lamellae and the second group of threaded rods being arranged so that they cross through the through holes provided in the vicinity of the lower edge of the plates of the lamellae.

In this preferred embodiment of the lamellar module according to the invention described in the preceding paragraph, the lamellae do not have more points of contact with one another than the threaded rods, which causes the lamellar channels to have a surface completely free of partitions, corners, clamps, welds, guides or attachments, reducing the number of points at which the solids may readily grab hold. This better performance against fouling will enable, in the lamellar modules according to the invention, the distance between the faces of the lamellae to be reduced, therefore increasing the treatment capacity per unit area installed.

Therefore, the hydraulics throughout all the lamellar channels of this lamellar module according to the present invention will be optimal, the speed of the effluent inside the lamellar module will, therefore, be the lowest possible for a certain treatment flow rate, reducing hydraulic losses to a minimum due to the speed gradient, that is, to those generated by the upper and lower surfaces of two contiguous lamellae demarcating the corresponding clarification distance.

In the state of the art, further losses in yield due to hydraulic performance in flat lamellae that are known range between values of 2 and 3%, due to the partitions forming the external racks of each module. And further losses in yield due to the hydraulic performance in tubular lamellae existing in the state of the art range between values of 12 and 18% due to the partitions forming each of the ducts.

In a preferred embodiment of the lamellar module according to the present invention, the supporting element, in addition to the two groups of threaded rods described above, also comprises:

spacers arranged in the vicinity of the upper edge and in the vicinity of the lower edge of the plates of each pair of adjacent lamella, each of said spacers being provided with a through opening so as to enable the passage, through said spacer, of at least one of the threaded rods; and threaded tightening means, arranged at least at one of the ends of each threaded rod.

In this preferred embodiment of the lamellar module according to the invention described in the preceding paragraph, the lamellae do not have more points of contact with one another than the spacers and the threaded rods running through the openings provided in said spacers.

Likewise, in this preferred embodiment of the invention, the supporting element is arranged inside the lamellar module given that the spacers are located between two contiguous lamellae and the threaded rods cross through the different lamellae and spacers by being inserted into the provided through openings and holes arranged in these two components. The spacers act like fastening and positioning elements for the lamellae of the lamellar module, keeping them in the working position thereof and secured to one another, by acting together with the threaded rods and the corresponding threaded tightening means thereof. The lamellar module according to this embodiment of the invention will therefore have its own independent and internal supporting element, which will make it self-supporting and ready for installation inside the tank.

This configuration represents an important difference with respect to lamellar modules of the prior art, wherein the supporting elements are arranged outside the lamellar module itself, closing off a portion of the lamellar channels. In fact, the usual losses in yield due to external supporting structures feature of the state of the art technologies range between values of 7% and 20%. In this preferred embodiment of the lamellar module according to the present invention, the space occupied by the internal supporting elements only represents approximate losses of 0.5%, which correspond to the space occupied by the spacers and the rest of the components that make up the supporting elements.

The spacers are preferably provided with frustoconical inner bushings, each of the frustoconical bushings being intended to receive at least one threaded rod and to be connected, by crossing through the lamella, with at least another bushing provided in an adjacent spacer or in a terminal part.

The spacers have in the support and fastening area thereof with each of the lamellae an inclination which will determine the final inclination of each of the lamellae once the lamellar module has been assembled. Due to this inclination and given the tightening pressure generated by the threaded means, said inclined supports tend to generate a vertical sliding of the separators with respect to one another and with the lamella, which would cause said elements to internally press the threaded rod and becoming blocked. This would prevent the pressure generated at the ends by the threaded tightening means from being correctly transmitted to separators and lamellae located in the central area of the lamellar module.

This configuration by means of frustoconical bushings crossing through the lamella and being successively inserted into the bushing of the contiguous separator solves this problem, maintaining the position of the separators with respect to one another and, in turn, with the lamella itself, releasing the threaded rod along the entire length thereof.

Terminal parts will end the assembly of the rack and will have a vertical plane perpendicular to the threaded rod which will facilitate the correct support for the tightening means fastening the assembly. These terminals will have different geometries in order to be adapted to the concave portion of the rib of the lamella or to the convex portion thereof. They will likewise provide the female or male area of the frustoconical bushing for being adapted to each end of the rack.

The spacers arranged in the vicinity of the lower edge of the plates are preferably provided with coupling means for coupling to a supporting base.

Said supporting base is intended to be placed inside the tank of a clarifier and, in addition to serving as a base for supporting the lamellar module according to the present invention, it also acts as an anti-flotation device, so it will not be necessary to add additional structures intended for this same purpose.

In a preferred embodiment of the present invention, the supporting base comprises at least one inverted T-shaped profile and the coupling means in turn comprise lugs which enable the spacers to be fitted, arranged in the vicinity of the lower edge of the plates, on said profile or profiles. Likewise, the lugs of the coupling means are preferably provided with perforations coinciding with respective holes made in the inverted T-shaped profile (or profiles). It is thereby possible to insert through elements, which are also part of said coupling means, into the holes made in the profile through the perforations provided in the lugs. The through elements can be screws or rivets, for example.

The laminar modules according to this preferred embodiment of the invention are arranged, in the working position thereof inside the tank of a clarifier, in a manner such that they are raised above the base of the inverted T-shaped profile or profiles serving as support without areas therefore being closed off due to the supporting bases.

The inverted T-shaped profiles can be made of metal or other materials, by way of example and without limitation, glass fibre-reinforced polyester.

Likewise, in another preferred embodiment of the invention, the supporting base is provided with at least one crosspiece whereon at least one inverted T-shaped profile is arranged. Given that said crosspiece (or crosspieces) is (are) located immediately below the inverted T-shaped profile (or profiles), the lamellar module will likewise be raised above them, without closed-off areas therefore being generated.

Said crosspieces are preferably structural profiles or structural beams providing further resistance to the supporting base.

Once these structures of the supporting base have been overcome, the upward effluent continues ascending through the lamellar module, being homogeneously distributed over the entire free surface inside the lamellar channels, minimizing the effective surface losses due to said crosspieces.

This causes the effective surface losses due to the supporting base to be virtually zero.

DESCRIPTION OF THE DRAWINGS

As a complement to the description provided herein, and for the purpose of helping to make the technical features of the invention more readily understandable, in accordance with preferred practical exemplary embodiments thereof, said description is accompanied by a set of drawings constituting an integral part of the same, which by way of illustration and not limitation, depict the following:

FIG. 1A shows a perspective view of a possible embodiment of a lamella according to the present invention;

DESCRIPTION OF THE INVENTION

Figure 1B:
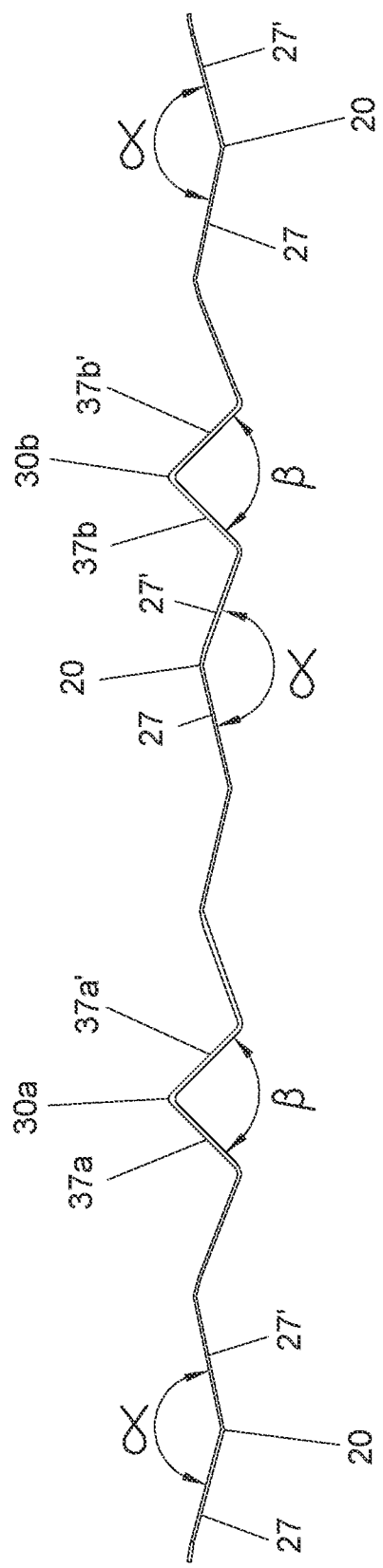
FIG. 1B is a cross-sectional view of the lamella shown in FIG. 1A.
Figure 2A:
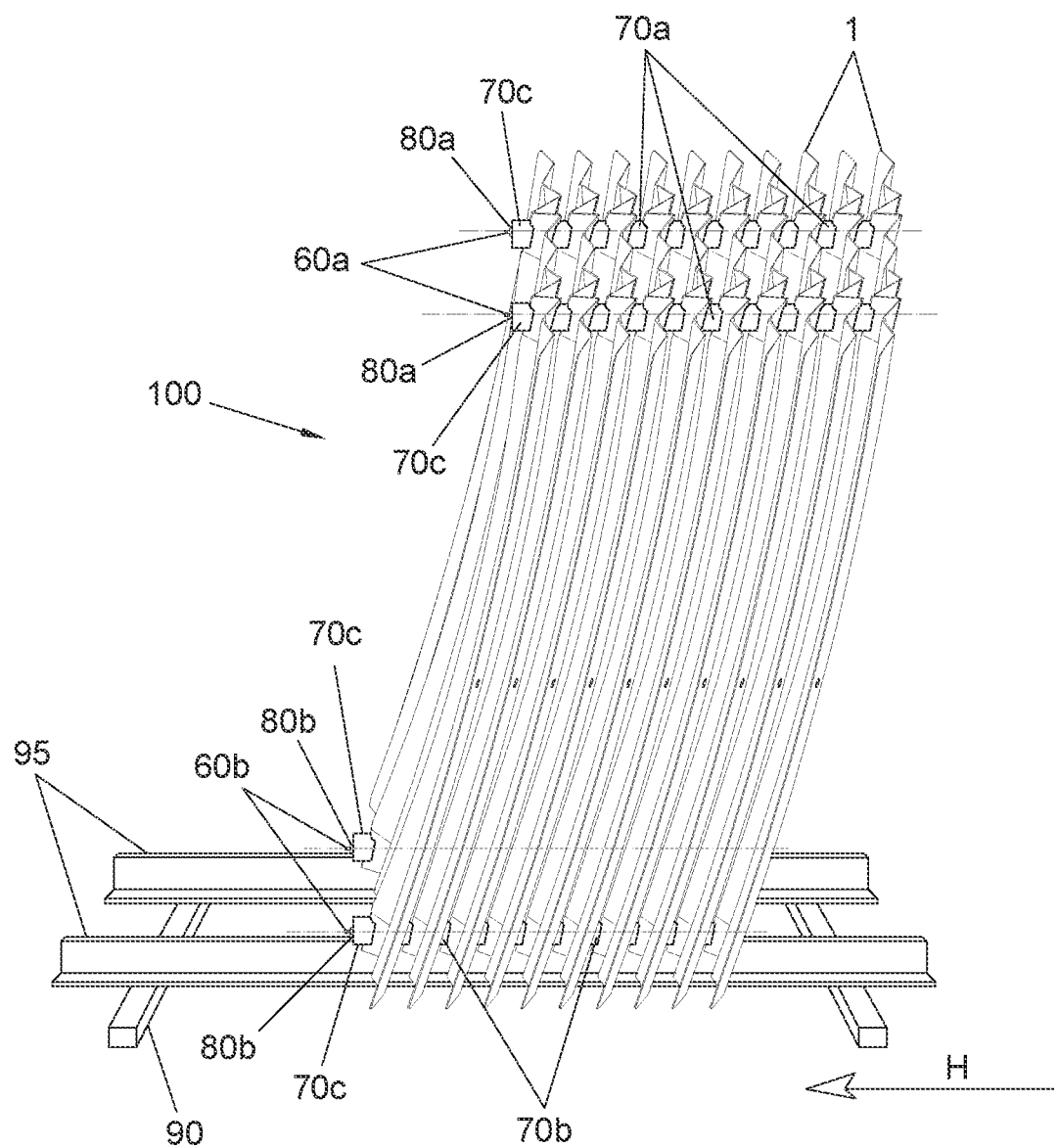
FIG. 2A is a side view of a possible embodiment of a lamellar module according to the present invention.
Figure 2B:
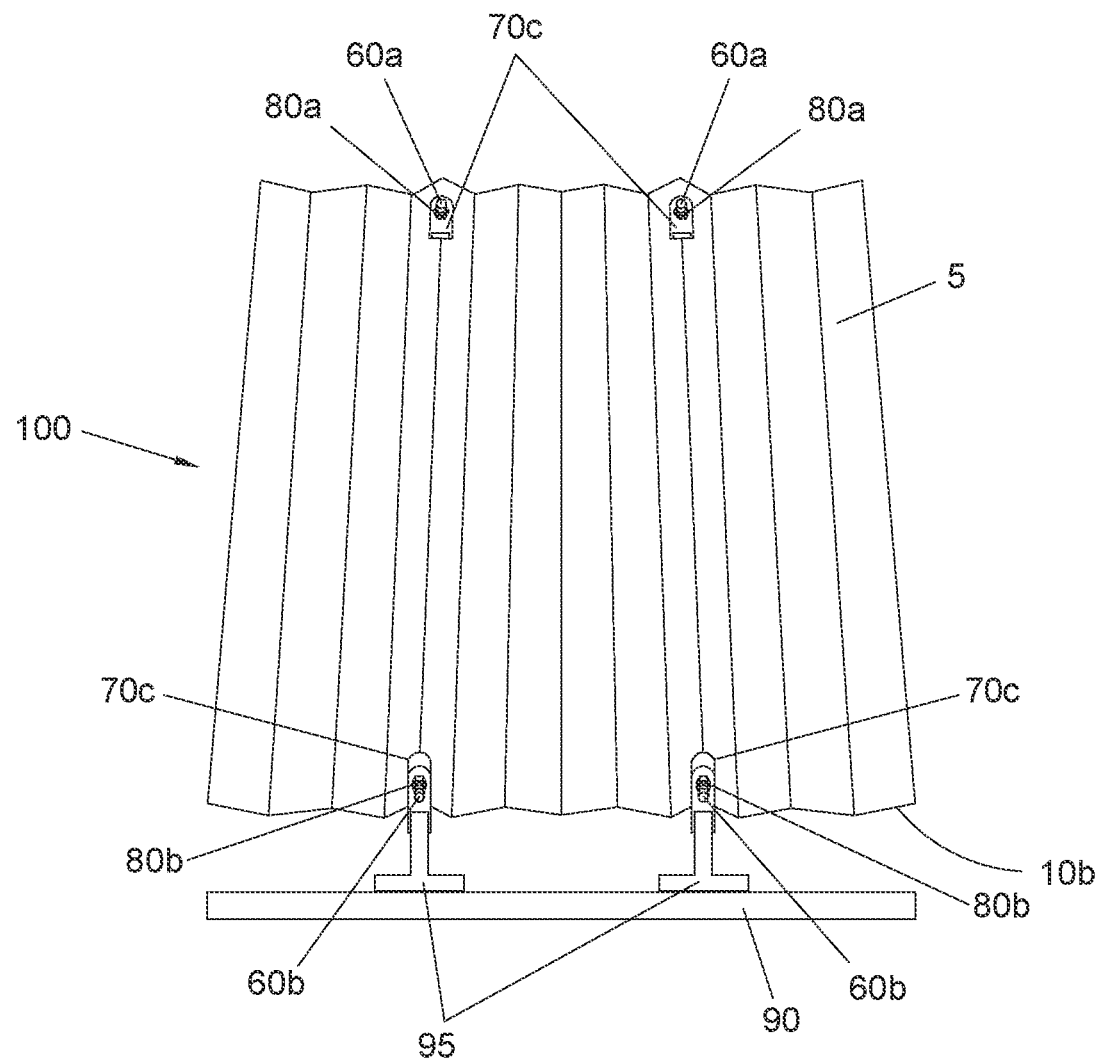
FIG. 2B is a front view of the lamellar module shown in FIG. 2A.
Figure 2C:
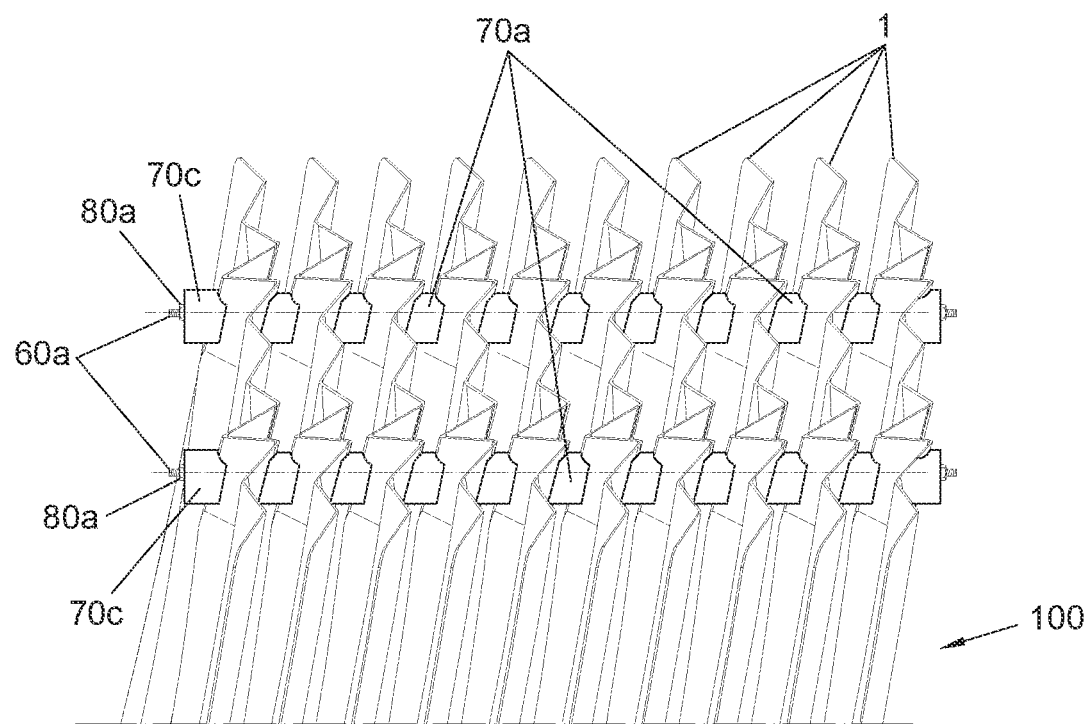
FIG. 2C is a perspective view showing further details of the lamellar module of FIG. 2A.
Figure 2D:
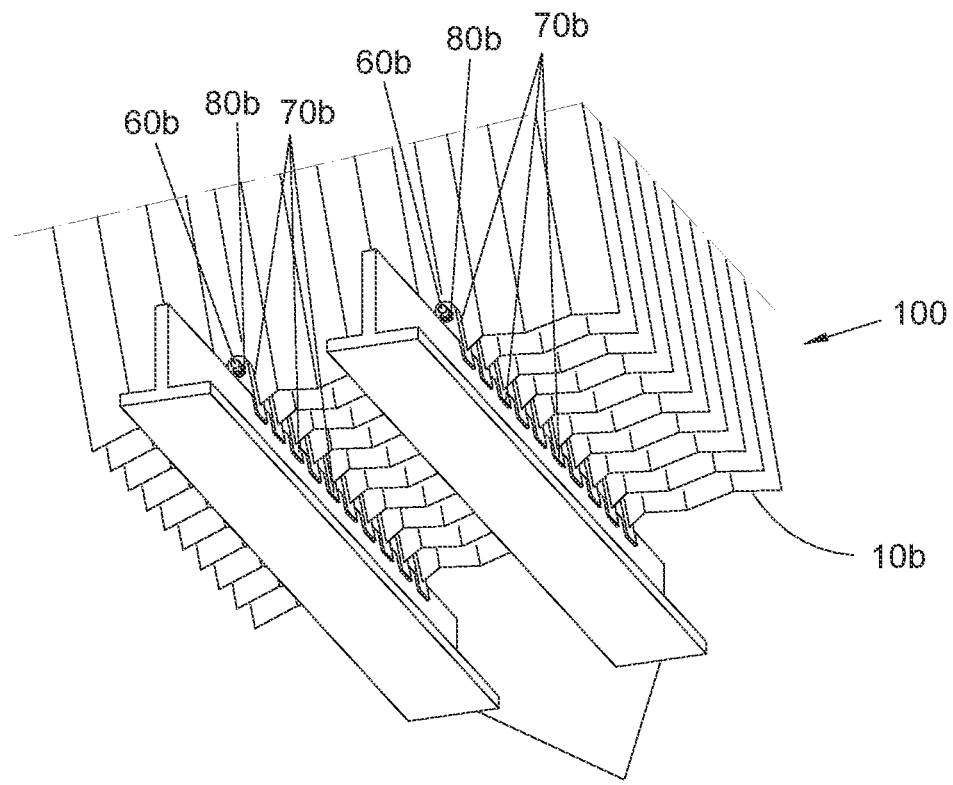
FIG. 2D is a bottom view of the device of FIG. 2A.
Figure 2E:
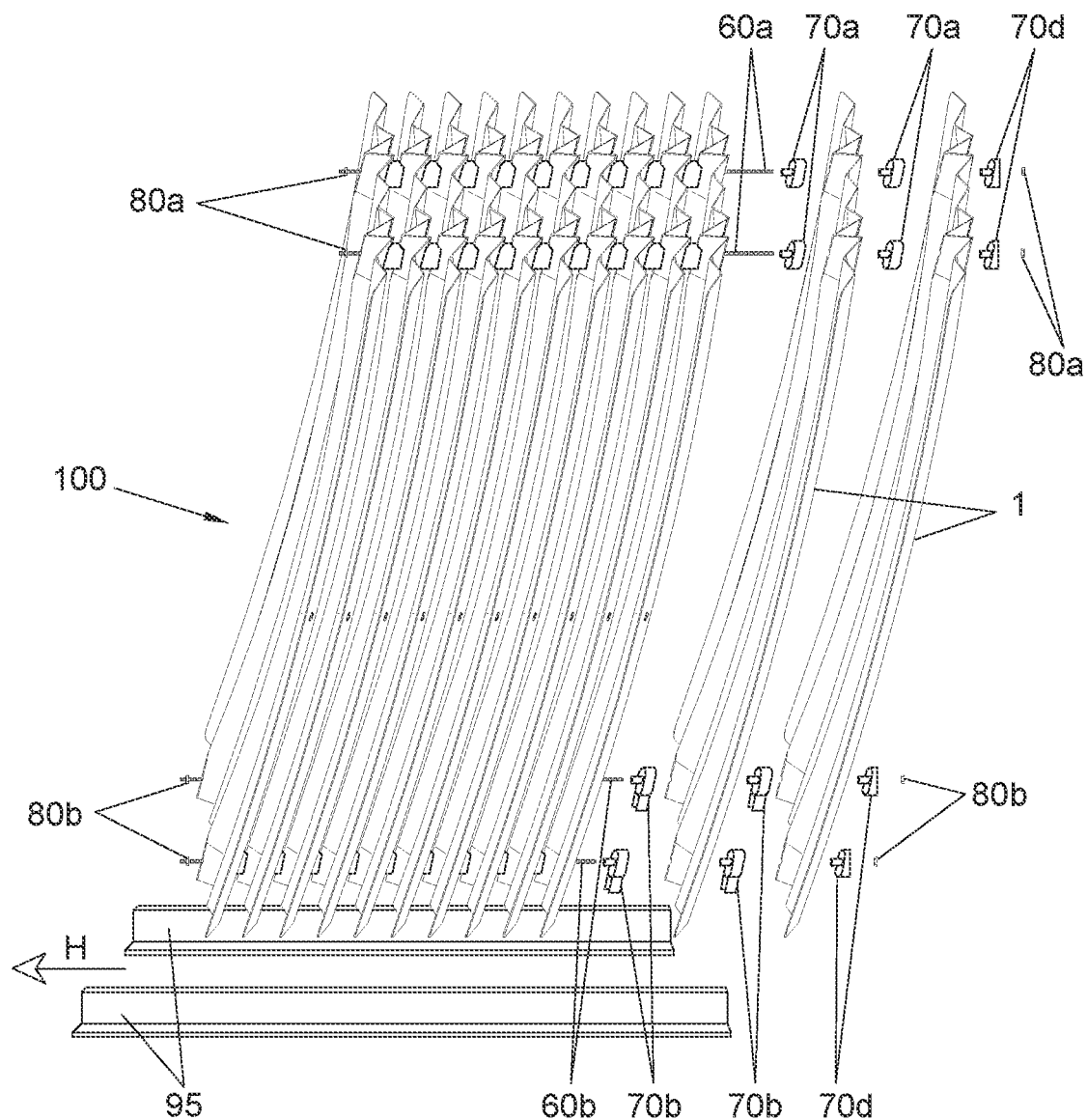
FIG. 2E is a partially exploded side view of the lamellar module of FIG. 2A.

A detailed explanation of a preferred exemplary embodiment of the present invention is provided below with the help of the attached FIGS. 1A to 3C.

Throughout the present description, as well as in the attached figures, the elements with equal or similar functions will be designated with the same numerical references.

FIG. 1A shows, by way of example and without limitation, an embodiment of a lamella 1 according to the present invention.

Said lamella 1 is formed by a plate 5 which, in this particular embodiment of the invention, has a rectangular shape, is made of glass fibre-reinforced polypropylene and was manufactured according to a plastic injection method. Said plate 5 is provided with an upper edge 10a and a lower edge 10b parallel to a transverse direction T, and two side edges 15a and 15b parallel to a longitudinal direction L. The total width of the lamella 1 is about one metre in the transverse direction and of 1.2 metres in the longitudinal direction. The plate 5 is further provided with:

longitudinal folds 20 running from the upper edge 10a to the lower edge 10b and defining a plurality of lamellar channels 25 intended, when the lamella is in its working position, to concentrate the solids in the lower areas or valleys of said folds;

a first longitudinal structural rib 30a located at ⅓ the total width of the lamella 1 in the transverse direction and a second longitudinal structural rib 30b located at ⅔ the total width in the transverse direction, and anchoring points 35 in the form of through holes formed on the structural ribs 30a and 30b and arranged in the vicinity of the upper edge 10a and in the vicinity of the lower edge 10b.

The lamella 1 is divided transversely into three different areas:

a central area, comprised between the first structural rib 30a and the second structural rib 30b and secured by said structural ribs 30a, 30b;

a first side area, located between the first structural rib 30a and the closest side edge 15a, and a second side area, located between the second structural rib 30b and the side edge 15b.

Therefore, as shown in detail in FIGS. 2A to 2E, the first side area and the second side area of the lamella 1 are cantilevered when said lamella 1 is arranged in a working position inside a clarifier.

In this particular embodiment of the invention, the structural ribs 30a and 30b have a thickness of between 3 and 3.5 mm in the vicinity of the upper edge 10a, in the vicinity of the lower edge 10b and in the central area 10c thereof, the thickness thereof being slightly reduced (between 2.5 and 3 mm) in the remaining areas through which they run. Likewise, the mean thickness of those portions of the lamella 1 that are not part of the structural ribs is just 2 mm.

That is, the lamella has a greater thickness at those points which will be subjected to higher stresses when the lamella is in the working position thereof (like in the structural ribs 30a and 30b, particularly in the vicinity of the anchoring points 35) and a smaller thickness in the remaining parts, so that stresses caused by the actual weight of the lamella are reduced and production costs are reduced.

FIG. 1A, furthermore, schematically illustrates how in this embodiment of the invention the plate 5 is curved along the longitudinal direction L according to a first constant radius R1, and how the structural ribs 30a, 30b also are curved along the longitudinal direction L according to a second constant radius R2. In this specific case, R1 is 10 metres and R2 is 8 m.

FIG. 1B in turn illustrates how the longitudinal folds 20 of the lamella 1 are formed by two wings 27 and 27' defining an obtuse angle α with one another, how the first structural rib 30a is formed by two wings 37a and 37a' defining a variable angle β with one another and how the second structural rib 30b is formed by two wings 37b and 37b' defining an angle β with one another. In this specific embodiment of the invention, the angle α has a fixed value of 155° along the entire longitudinal direction of the lamella 1. Conversely, angle β, feature of the structural ribs 30a and 30b, has a value of 90° in the vicinity of the edges 10a and 10b which progressively increases until reaching 117° in the central region 10c.

FIGS. 2A to 2E show different views of a lamellar module 100 according to the present invention.

Said lamellar module 100 comprises several lamellae 1 identical to those illustrated in FIGS. 1A and 1B, arranged parallel and without direct contact with one another, with an inclined orientation with respect to the horizontal direction H. The lamellae 1 are likewise attached to a supporting element which, in this embodiment of the present invention, comprises a first group of threaded rods 60a, arranged so that they cross through the plates 5 of the lamellae 1a through the through holes provided in the vicinity of the upper edge 10a and a second group of threaded rods 60b, arranged so that they cross through the plates 5 of the lamellae 1a through the through holes provided in the vicinity of the lower edge 10b. Each rod of the first group of threaded rods 60a is attached at one of the ends thereof to threaded tightening means 80a which are, in this particular embodiment of the invention, a nut. Likewise, each rod of the second group of threaded rods 60b is attached at one of the ends thereof to threaded tightening means 80b (also in the form of a nut). A terminal part 70c is placed between each nut 80a and 80b and the last lamella 1 (that is, said lamella which is closer to the end of the rod 60a or 60b whereon the corresponding nut 80a or 80b is screwed). Said terminal parts 70c define a vertical plane, perpendicular to the rod 60a or 60b, which facilitates the correct support of the nuts 80a and 80b.

In this embodiment of the present invention, the supporting element also comprises a plurality of spacers 70a arranged in the vicinity of the upper edge 10a between each pair of lamellae 1 and a plurality of spacers 70b arranged in the vicinity of the lower edge 10b of the plates 5 between each pair of lamellae 1.

Figure 3A:
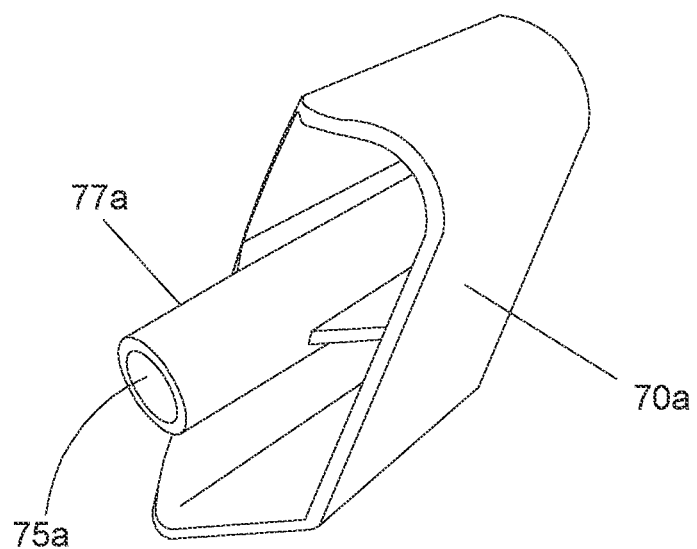
FIG. 3A is a perspective view of a spacer, arranged in the vicinity of the upper edge, of the lamellar module shown in FIGS. 2A to 2D.
Figure 3B:
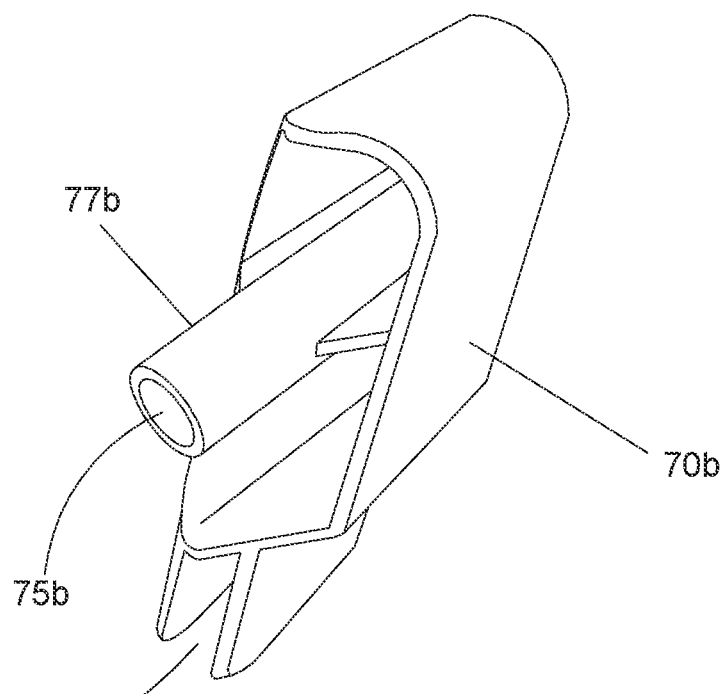
FIG. 3B is a perspective view of a spacer, arranged in the vicinity of the lower edge, of the lamellar module shown in FIGS. 2A to 2D.

As best seen in FIG. 3B, the spacers 70b arranged in the vicinity of the lower edge 10b of the plates 5 are provided with coupling means 73 for coupling to inverted T-shaped profiles 95 of the supporting base.

Said coupling means 73 are, in this particular embodiment of the invention, lugs made of a single part together with the spacer 70b.

The inverted T-shaped profiles 95 of the supporting base are in turn attached to crosspieces 90, which also make up part of the supporting base.

FIG. 3A shows a spacer 70a which, in a lamellar module such as the one shown in FIGS. 2A to 2E, is arranged in the vicinity of the upper edge 10a.

In this embodiment of the invention, the spacer 70a is made of polypropylene and was manufactured by means of a plastic injection method. Likewise, the spacer 70a is provided with a frustoconical bushing 77a, which is intended to receive a threaded rod 60a in the through opening 75a thereof and to be connected with at least another bushing of an adjacent spacer 70a, or in a terminal part 70c which will be described with further detail in relation to FIG. 3C.

FIG. 3B shows a spacer 70b intended to be placed in the vicinity of the lower edge 10b of the plates 5.

In this embodiment of the invention, the spacers 70b are made of polypropylene and were manufactured by means of a plastic injection method. Likewise, the spacer 70b is provided with a frustoconical bushing 77b, which is intended to receive a threaded rod 60b in the through opening 75b thereof and to be connected with at least another bushing of an adjacent spacer 70b, or in a female terminal part 70c or in a male terminal part 70d. As seen above, the spacers 70b are also provided with lugs 73 which enable the lamellar module 100 to be coupled to the inverted T-shaped profiles 95 of the supporting base.

Figure 3C:
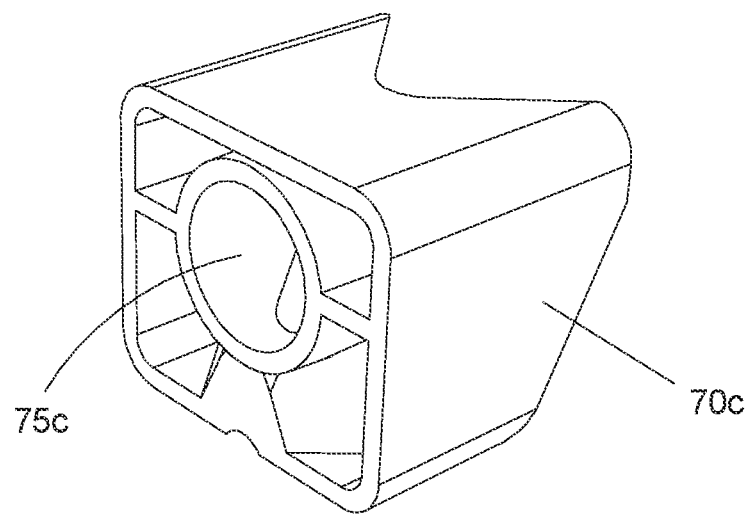
FIG. 3C is a perspective view of a female terminal part, provided in the lamellar module shown in FIGS. 2A to 2E.

FIG. 3C shows a female terminal part 70c made of polypropylene and manufactured by means of a plastic injection method. Said terminal part 70c is provided with a cavity 75c intended to house the frustoconical bushing 77a, 77b of the corresponding adjacent spacer 70a, 70b.

Figure 3D:
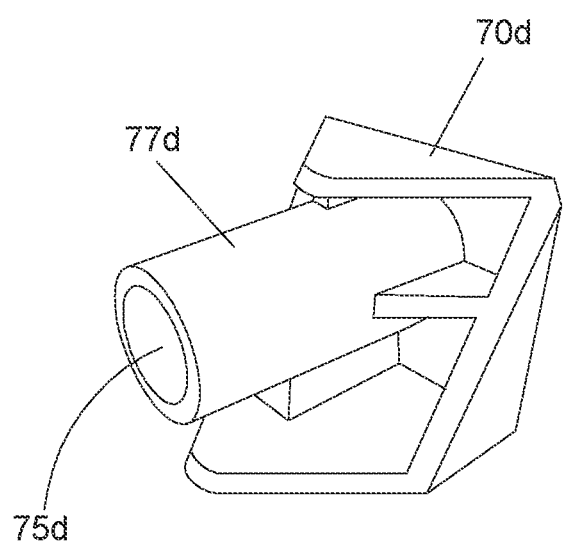
FIG. 3D is a perspective view of a male terminal part, provided in the lamellar module shown in FIGS. 2A to 2E.

FIG. 3D shows a male terminal part 70d made of polypropylene and manufactured by means of a plastic injection method. Said male terminal part 70d is provided with a frustoconical bushing 77d provided with a through opening 75d.

NUMERICAL REFERENCES OF THE FIGURES (1) Lamella;
(5) Lamella plate;
(10a) Upper edge of the plate;
(10b) Lower edge of the plate;
(10c) Central region;
(15a, 15b) Side edges of the plate;
(20) Longitudinal folds;
(25) Lamellar channels;
(27, 27') Wings of the longitudinal folds;
(α) Angle defined by the wings of the longitudinal folds;

(30a, 30b) Longitudinal structural ribs;
(35) Anchoring points;
(37a, 37a'; 37b, 37b') Wings of the structural ribs;
(β) Angle defined by the wings of the structural ribs;
(60a) First group of threaded rods;
(60b) Second group of threaded rods;
(70a) Spacers arranged in the vicinity of the upper edge;
(70b) Spacers arranged in the vicinity of the lower edge;
(70c) Female terminal part;
(70d) Male terminal part;
(73) Coupling means for coupling to the supporting base (lugs);
(75a, 75b) Through openings of the spacers;
(75c) Cavity of the female terminal part;
(75d) Through opening of the male terminal part;
(77a, 77b) Frustoconical inner bushings of the spacers;
(77d) Bushing of the male terminal part;
(80a, 80b) Threaded tightening means (nuts);
(90) Crosspieces of the supporting base;
(95) Inverted T-shaped profiles of the supporting base;
(100) Lamellar module;
(L) Longitudinal direction;
(T) Transverse direction;
(H) (L) Horizontal direction;
(R1) First radius of curvature (of the plate);
(R2) Second radius of curvature (of the structural ribs).

The invention claimed is:

1. A lamella for a clarifier formed by a rectangular or square plate, having an upper edge and a lower edge running parallel to a transverse direction and two remaining side edges running parallel to a longitudinal direction,
wherein the plate is curved along the longitudinal direction thereof so that, in a working position thereof, an area closer to the lower edge of the plate is less inclined relative to a horizontal than an area closer to the upper edge of the plate, and
wherein the plate is provided with a plurality of longitudinal folds, said longitudinal folds running from the upper edge of the plate to the lower edge of the plate and said longitudinal folds likewise being provided with a curvature in the longitudinal direction.

2. The lamella according to claim 1, wherein the at least one longitudinal fold demarcated by two wings, forming an obtuse angle with one another at an angle of between 150 and 160°.

3. The lamella according to claim 1, further comprising at least one longitudinal structural rib, curved along the longitudinal direction and demarcated by two wings running from the upper edge of the plate to the lower edge of the plate, forming a variable angle with one another, wherein the angle is
between 80 and 90° in the vicinity of the upper edge,
between 80 and 90° in the vicinity of the lower edge, and
progressively increasing until reaching between 115° and 120° in a central regions of the lamella.

4. The lamella according to claim 3, wherein the at least one longitudinal structural rib is provided with anchoring points for anchoring to a supporting element, said anchoring points being arranged in the vicinity of the upper edge of the plate and in the vicinity of the lower edge of the plate.

5. The lamella according to claim 4, wherein an area in the vicinity of the upper edge, an area in the vicinity of the lower edge and the central region of said at least one structural rib have a thickness greater than the rest of the structural rib, said structural rib further having a thickness greater than the rest of the lamella.

6. The lamella according to claim 3, wherein a first structural rib is located at ⅓ the total width of the lamella in the transverse direction, and a second structural rib located at ⅔ the total width in the transverse direction, the first structural rib and the second structural rib being provided with anchoring for anchoring to a supporting element, said anchoring points being arranged in the vicinity of the upper of the plate and in the vicinity of the lower edge of the plate.

7. The lamella according to claim 6, wherein the lamella is divided transversely into three different areas comprising:
a central area, comprised between the first structural and the second structural rib which is supported by said structural ribs;
a first side area, located between the first structural rib and the closest side edge; and
a second side area, located between the second structural and the closest side edge;
wherein the first side area and the second side area are cantilevered when the lamella is arranged in a working position.

8. The lamella according to claim 3, wherein the at least one longitudinal structural rib is curved along the longitudinal direction, thereof according to a second constant radius of curvature, and wherein the plate furthermore is curved along the longitudinal direction thereof according to a first constant radius of curvature and the second radius of curvature being less than the first radius of curvature.

9. The lamella according to claim 8, wherein the first constant radius of curvature is 9 to 10 metres and the second constant radius of curvature is 7 to 8.5 metres.

10. The lamella according to claim 1, wherein the is a plastic lamella manufactured according to a plastic injection method.

11. The lamella according to claim 1, wherein the plate is curved along the longitudinal direction thereof, describing a first constant radius of curvature.

12. The lamella according to claim 11, wherein the first constant radius of curvature of the plate is 7 to 12 metres.

13. The lamella according to claim 11, wherein the first constant radius of curvature of the plate is 9 to 10 metres.

14. A lamellar module for a clarifier comprising two or more lamellae according to claim 1, arranged in a parallel manner without direct contact with one another and attached to a supporting element.

15. The lamellar module according to claim 14, wherein each of the lamellae is provided with at least one longitudinal structural rib provided with anchoring points in the form of through holes, said through holes being located in the vicinity of the upper edge of the plates of the lamellae and in the vicinity of the lower edge of the plates of the lamellae and wherein
the supporting element comprises at least two groups of threaded rods the first group of threaded rods being arranged so that they cross through the through holes provided in the vicinity of the upper edge of the plates of the lamellae and the second group of threaded rods being arranged so that they cross through the through holes provided in the vicinity of the lower edge of the plates of the lamellae.

16. The lamellar module according to claim 15, wherein the supporting element further comprises:
spacers arranged in the vicinity of the upper edge and spacers arranged in the vicinity of the lower edge of the plates of each pair of adjacent lamellae, each of said spacers being provided with a through opening so as to enable the passage, through said spacer, of at least one of the threaded rods; and threaded tightening means arranged at least at one of the ends of each threaded rod.

17. The lamellar module according claim 16, wherein the spacers arranged in the vicinity of the lower edge of the plates are provided with coupling means for coupling to a supporting base.

18. The lamellar module according to claim 17, wherein the supporting base comprises at least one inverted T-shaped profile.

19. The lamellar module according to claim 18, wherein the coupling means are lugs provided with perforations coinciding with respective holes, made in the inverted T-shaped profile said coupling means further comprising through elements intended to be introduced in the holes made in the profile through the perforations provided in the lugs.

20. The lamellar module according to claim 15, wherein spacers are provided with frustoconical inner bushings, each of said frustoconical bushings being intended to receive at least one threaded rod and to be connected, by crossing through a lamella, with at least another bushing provided in an adjacent spacer or in a terminal part.

* * * * *

UNITED STATES PATENT AND TRADEMARK OFFICE
CERTIFICATE OF CORRECTION

PATENT NO. : 11,247,146 B2
APPLICATION NO. : 17/270473
DATED : February 15, 2022
INVENTOR(S) : Pedro Roberto Rodriguez Gomez It is certified that error appears in the above-identified patent and that said Letters Patent is hereby corrected as shown below:

On the Title Page

Item [57], Line 6, delete "lower" and insert -- lower edge --

In the Claims

Column 17, Line 33, Claim 1, delete "wherein" and insert -- wherein, --

Column 17, Line 38, Claim 1, delete "wherein" and insert -- wherein, --

Column 17, Line 44, Claim 2, delete "fold" and insert -- fold is --

Column 17, Line 56, Claim 3, delete "regions" and insert -- region --

Column 17, Line 64, Claim 5, delete "rib" and insert -- rib, --

Column 18, Line 6, Claim 6, delete "anchoring" and insert -- anchoring points --

Column 18, Line 7, Claim 6, delete "upper" and insert -- upper edge --

Column 18, Line 11, Claim 7, delete "structural" and insert -- structural rib --

Column 18, Line 12, Claim 7, delete "rib" and insert -- rib, --

Column 18, Line 16, Claim 7, delete "structural" and insert -- structural rib --

Column 18, Line 17, Claim 7, delete "edge;" and insert -- edge, --

Column 18, Line 23, Claim 8, delete "direction," and insert -- direction --

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*

Column 18, Line 31, Claim 10, delete "the" and insert -- the lamella --

Column 18, Line 51, Claim 15, delete "lamellae" and insert -- lamellae, --

Column 18, Line 53, Claim 15, delete "rods" and insert -- rods, --

Column 19, Line 1, Claim 16, delete "means" and insert -- means, --

Column 19, Line 13, Claim 19, delete "profile" and insert -- profile, --